United States Patent
Henkner

(10) Patent No.: US 7,996,123 B2
(45) Date of Patent: Aug. 9, 2011

(54) DEVICE AND METHOD FOR CONTROLLING THE ENGINE SPEED AND THE SLIP OF THE CLUTCH OF A SHIP'S PROPULSION SYSTEM

(75) Inventor: Rainer Henkner, Hannover (DE)

(73) Assignee: Robert Bosch GmbH (DE)

( * ) Notice: Subject to any disclaimer, the term of this patent is extended or adjusted under 35 U.S.C. 154(b) by 228 days.

(21) Appl. No.: 12/471,800

(22) Filed: May 26, 2009

(65) Prior Publication Data
US 2009/0298363 A1 Dec. 3, 2009

(30) Foreign Application Priority Data
May 27, 2008 (DE) .......................... 10 2008 025 480

(51) Int. Cl.
*B63H 21/21* (2006.01)
(52) U.S. Cl. ........................................... 701/21; 440/86
(58) Field of Classification Search .................... 440/84, 440/86; 701/21
See application file for complete search history.

(56) References Cited

U.S. PATENT DOCUMENTS

| | | | | |
|---|---|---|---|---|
| 5,336,120 A | * | 8/1994 | Maurer et al. | 440/84 |
| 7,052,341 B2 | * | 5/2006 | Kaji et al. | 440/75 |
| 2008/0091324 A1 | * | 4/2008 | Werner et al. | 701/68 |

* cited by examiner

*Primary Examiner* — Stephen Avila
(74) *Attorney, Agent, or Firm* — Jack Schwartz & Associates, PLLC

(57) ABSTRACT

A control unit and a method for influencing the speed of an engine and the slip of a downstream clutch of a transmission of a ship's propulsion system via an electronic control unit in response to a manual control-signal generator to select the sense of rotation and the driving speed, wherein, as the clutch is engaged to initiate forward or reverse driving, a slip determination unit of the electronic control unit influences the slip of the clutch in response to a ramp function characteristic to reduce the clutch's slip during an engagement period.

8 Claims, 1 Drawing Sheet

DEVICE AND METHOD FOR CONTROLLING THE ENGINE SPEED AND THE SLIP OF THE CLUTCH OF A SHIP'S PROPULSION SYSTEM

FIELD OF THE INVENTION

The present invention relates to a control device and a method for influencing the speed of an engine and the slip of a downstream clutch of a ship's propulsion system by means of an electronic control unit in response to a manual control-signal generator to select the sense of rotation and the cruising speed.

BACKGROUND OF THE INVENTION

The field of use of the present invention extends to ships' propulsion systems, preferably in the field of yacht construction. Here, usually internal combustion engine-driven ships' propulsion systems with preferably one or two propellers are used. They are caused to rotate via a transmission downstream of the engine. While the engine is usually controllable with respect to its speed, to determine the cruising speed of the ship, the transmission is usually switchable with respect to the sense of rotation to select between forward and reverse.

In many cases, the transmission is also integrated in a clutch adjustable with respect to its slip, where a trolling speed is controllable by varying the clutch's slip. At this trolling speed, the engine speed usually remains constant in the range of the idling speed, while the driving speed of the ship is determined by varying the slip of the clutch. Trolling operation created in this manner can be used, for example, when crawling in port or during high sea fishing.

EP 0 524 992 B1 discloses a generic control device. It comprises control and sensor means for influencing the engine speed, and the slip of the clutch, and is connected on the input side with a control-signal generator to select the driving direction and speed of the ship by operating at least one control lever, wherein the control lever is used to adjust a propeller shaft speed and sense of rotation, the adherence to which is closed-loop controlled by the control electronics in such a way that a mode of operation is freely defined as a function of the operating parameters of the engine and the transmission to be adhered to, which can be either a first mode of operation, in which the propeller shaft speed and sense of rotation is created with the clutch engaged by changing the engine speed, or a second mode of operation, wherein the propeller shaft speed and sense of rotation is created with a predefined engine speed by varying the slip of the clutch.

The sensor means required for closed-loop controlling of the clutch operation leads to substantial electronic overhead. Furthermore, the variation of the slip of the clutch is abrupt. This is because the adjustment value for the adjustable clutch is varied directly in response to the setpoint value. This leads to high mechanical stresses on the drive train, in particular during maneuvering.

SUMMARY OF THE INVENTION

It is therefore the object of the present invention to create a control apparatus for a ship's propulsion system, which ensures in a technically simple manner a drive train-saving engaging process, in particular for powerful engines.

The object is solved on the basis of a control apparatus according to the preamble of claim 1 in combination with its characterizing features. The object is also solved by a method according to claim 5. With respect to the entire arrangement of a ship's propulsion system, reference is made to claim 9. The dependent claims respectively referring back to the independent claims define advantageous embodiments of the invention.

The invention includes the technical teaching that during engagement of the slip-adjustable clutch, for facilitating forward or reverse driving, a slip-determining unit of the electronic control unit influences the slip of the clutch in response to a ramp function characteristic to reduce the clutch's slip during a predefined engagement period.

The advantage of the approach according to the present invention lies in particular in that gentle engagement, in particular when changing the driving direction, is achieved with simple signal processing means. This is because the clutch is no longer driven by a jump in the adjustment value, but the adjustment value is gradually changed in the direction of the desired clutch slip. This does not limit the full power of the ship's propulsion system but only carries out the engagement process in a manner that is gentle on the propulsion system. Moreover, thanks to the slower acceleration due to the ramp function characteristic, the skipper has more time to adjust the desired maneuvering speed before disengagement must be carried out again. Maneuvering thus becomes easier and also safer. The clutch adjustable with respect to its slip does not transmit any torque with maximum slip and engages the clutch with minimum slip. This range indicates the clutch's slip "s". The engagement period "t" for gentle engagement is preferably in the range of a few seconds, more preferably in the range of 1 to 2 seconds. It is suggested to select a shorter engagement period "t" for larger ships with more inert masses to be moved and for ships with smaller power reserves.

According to a measure improving on the invention, it is suggested that the electronic control unit splits the cruise command given by the manual control-signal generator, i.e. simultaneously feeds it to a first converter unit for characteristic-controlled determination of an engine speed signal for the downstream engine, and also to a second converter unit for characteristic-controlled determination of a sense-of-rotation signal for the downstream clutch. The slip determination unit according to the present invention can be downstream of the second converter unit to fulfill its function of driving the clutch. The slip determination unit is thus optimally placed along the signal flow to achieve the desired effect of gentle clutch engagement.

According to another measure to improve on the invention it is suggested to insert a speed limiting unit in the signal processing between first converter unit and the engine. At this position of the signal flow, the engine speed is thus limited to a range particularly suitable for trolling operation to ensure steady and manually well controlled driving by the skipper in cooperation with the slip determination unit according to the present invention. This is because while the ramp function of the slip determination unit is active, the engine speed is held in a range suitable for trolling operation by means of the speed limitation.

In order to ensure good maneuverability for the skipper, both the driving direction and the driving speed are manually predeterminable as a function of the selected position of at least one operating lever, preferably by means of the control-signal generator, constructed in conventional fashion, of the electronic control unit.

BRIEF DESCRIPTION OF THE DRAWINGS

Further measures improving on the invention will be illustrated in more detail with the description of a preferred exemplary embodiment of the invention with reference to the single drawing FIGURE. The FIGURE shows a schematic block diagram of an arrangement of a ship's propulsion system with an electronic control apparatus

DETAILED DESCRIPTION OF THE INVENTION

Figure 1:
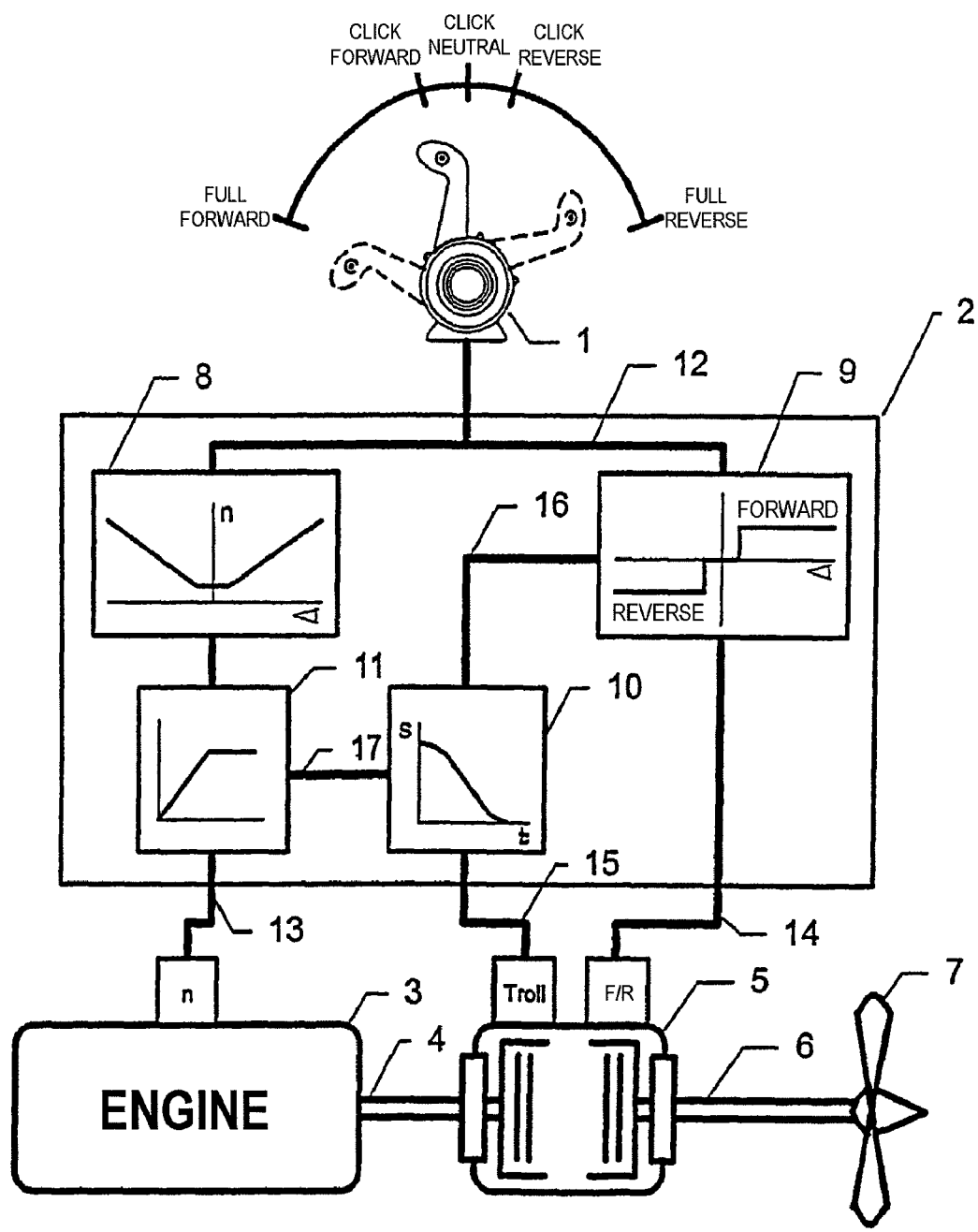

According to the FIGURE, the control apparatus comprises a control-signal generator 1 for manually selecting the sense of rotation and the driving speed of the ship (not shown here in any more detail) as a function of the position of the operating lever selected by the skipper. The control signal thus generated is fed to an electronic control unit 2, which carries out a special signal processing operation, explained in more detail below, to adjust on the output side the speed n of a motor 3, and a slip of an adjustable clutch integrated in the downstream transmission 5 and the sense of rotation of the transmission 5. Engine 3 is an internal combustion engine and is connected with the input of transmission 5 via a drive shaft 4. On the output side of transmission 5, a propeller shaft 6 extends to a propeller 7 to propel the ship.

Electronic control unit 2 splits the cruise command given by the manual control-signal generator on its input side, so that it is fed both to a first converter unit 8 and to a second converter unit 9. First converter unit 8 determines an engine speed signal 13 for the connected engine 3 in response to the characteristic shown. A speed limiting unit 11 is interposed between the first converter unit 8 and the engine 3. Speed limiting unit 11 limits the engine speed, in particular to a range suitable for trolling operation, in which the engine 3 has stable operating conditions.

Second converter unit 9, in contrast, is for characteristic-controlled determination of a sense-of-rotation signal 14 for transmission 5 connected thereto. The sense-of-rotation signal 14 indicates whether the transmission 5 is rotated forward or backward to initiate forward or reverse driving of the ship.

For engaging the clutch of transmission 5 to initiate forward or reverse driving, in trolling operation, a slip determination unit 10 is interposed between the second converter unit 9 and the transmission 5. The slip determination unit 10 controls the slip for the downstream clutch of transmission 5 in response to a ramp function characteristic. By means of this ramp function characteristic, the clutch's slip s is reduced during an engagement period t of 2 seconds in the present case, to enable gentle engagement at transmission 5. Moreover, slip determination unit 10 also generates a switching signal 17 to activate speed limiting unit 11 for speed limiting the engine 3 to ensure correspondingly coordinated driving of the ship's propulsion system.

The invention is not limited to the preferred exemplary embodiment described above. Rather, modifications are conceivable, which are also comprised by the scope of the appended claims. It is also possible, for example, to control a plurality of transmissions with propeller shafts connected thereto with the approach according to the present invention in order to ensure gentle engagement of the connected propulsion system of the ship.

The invention claim is:

1. A control apparatus for influencing the speed of an engine, and the slip of a downstream clutch of a transmission of a ship's propulsion system via an electronic control unit in response to a manual control-signal generator to select the sense of rotation and the driving speed,
   wherein during engagement of the clutch for initiating forward or reverse driving, a slip determination unit of the electronic control unit influences the slip of the clutch in response to a ramp function characteristic to reduce the clutch slip(s) during an engagement period; and
   wherein the electronic control unit feeds a cruise command given by the manual control-signal generator in a split manner to a first converter unit for characteristic-controlled determination of an engine speed signal for the downstream engine, and to a second converter unit for characteristic-controlled determination of a sense-of-rotation signal for the downstream transmission.

2. The control apparatus according to claim 1,
   wherein, between the first converter unit and the engine, a speed-limiting unit is provided to limit the engine speed to a range suitable for trolling operation.

3. The control apparatus according to claim 1,
   wherein both the driving direction and the driving speed are manually selectable as a function of a selected position of at least one operating lever by means of the control-signal generator of the electronic control unit.

4. A method for influencing the speed of an engine, and the slip of a downstream clutch of a transmission of a ship's propulsion system via an electronic control unit in response to a manual control-signal generator to select the sense of rotation and the driving speed,
   wherein as the clutch is engaged for initiating forward or reverse driving, the clutch's slip is influenced in response to a ramp function characteristic to reduce the clutch's slip along the engagement path by a slip determination unit of the electronic control unit; and
   wherein, by the electronic control unit, a cruise command given by the manual control-signal generator is fed to a first converter unit for characteristic-controlled determination of an engine speed signal for the downstream engine, and to a second converter unit for characteristic-controlled determination of a sense-of-rotation signal for downstream switching of the transmission.

5. The method according to claim 4,
   wherein a limitation of the predeterminable engine speed to a range suitable for trolling operation is carried out by a speed limiting unit.

6. The method according to claim 5,
   wherein the activation of the speed limiting unit is carried out by a switching signal of the slip determination unit.

7. A ship propulsion arrangement, having at least one engine for creating the propulsion power, downstream of which a clutch of a transmission is connected, wherein the engine and the transmission are connected to an electronic control apparatus according to claim 1.

8. The ship propulsion arrangement according to claim 7,
   wherein, on the output side of the transmission, at least one propeller shaft is arranged for each associated propeller.

* * * * *